(12) United States Patent
Saidi et al.

(10) Patent No.: US 9,996,471 B2
(45) Date of Patent: Jun. 12, 2018

(54) CACHE WITH COMPRESSED DATA AND TAG

(71) Applicant: ARM Limited, Cambridge (GB)

(72) Inventors: Ali Saidi, Austin, TX (US); Kshitij Sudan, Austin, TX (US); Andrew Joseph Rushing, Austin, TX (US); Andreas Hansson, Cambridge (GB); Michael Filippo, Driftwood, TX (US)

(73) Assignee: Arm Limited, Cambridge (GB)

( * ) Notice: Subject to any disclaimer, the term of this patent is extended or adjusted under 35 U.S.C. 154(b) by 25 days.

(21) Appl. No.: 15/194,902

(22) Filed: Jun. 28, 2016

(65) Prior Publication Data

US 2017/0371793 A1    Dec. 28, 2017

(51) Int. Cl.
*G06F 12/0871* (2016.01)
*G06F 12/0873* (2016.01)
*G06F 12/0895* (2016.01)

(52) U.S. Cl.
CPC ...... *G06F 12/0871* (2013.01); *G06F 12/0873* (2013.01); *G06F 12/0895* (2013.01); *G06F 2212/305* (2013.01); *G06F 2212/401* (2013.01); *G06F 2212/466* (2013.01)

(58) Field of Classification Search
CPC ............. G06F 12/0871; G06F 12/0873; G06F 2212/40
See application file for complete search history.

(56) References Cited

U.S. PATENT DOCUMENTS

| | | | | |
|---|---|---|---|---|
| 6,216,213 B1 * | 4/2001 | Breternitz, Jr. | ....... | G06F 9/3017 707/999.101 |
| 6,879,266 B1 | 4/2005 | Dye et al. | | |
| 8,139,073 B1 * | 3/2012 | Van Dyke | ............... | H03M 7/30 345/535 |
| 8,370,567 B1 * | 2/2013 | Bonwick | ............... | G06F 3/0611 711/103 |
| 8,587,600 B1 * | 11/2013 | Tischler | ................. | G09G 5/363 345/537 |
| 8,862,823 B1 * | 10/2014 | Glasco | ................ | G06F 12/0848 711/118 |

(Continued)

OTHER PUBLICATIONS

M. Thuresson, L. Spracklen and P. Stenstrom, "Memory-Link Compression Schemes: A Value Locality Perspective," in IEEE Transactions on Computers, vol. 57, No. 7, pp. 916-927, Jul. 2008.

(Continued)

*Primary Examiner* — Midys Rojas
*Assistant Examiner* — Khoa D Doan
(74) *Attorney, Agent, or Firm* — Leveque IP Law, P.C.

(57) ABSTRACT

Cache line data and metadata are compressed and stored in first and, optionally, second memory regions, the metadata including an address tag When the compressed data fit entirely within a primary block in the first memory region, both data and metadata are retrieved in a single memory access. Otherwise, overflow data is stored in an overflow block in the second memory region. The first and second memory regions may be located in the same row of a DRAM, for example, or in different regions of a DRAM and may be configured to enable standard DRAM components to be used. Compression and decompression logic circuits may be included in a memory controller.

20 Claims, 7 Drawing Sheets

(56) References Cited

U.S. PATENT DOCUMENTS

| | | | |
|---|---|---|---|
| 9,330,001 B2* | 5/2016 | Arelakis | G06F 12/0811 |
| 9,652,384 B2* | 5/2017 | Trika | G06F 12/0802 |
| 9,684,604 B2* | 6/2017 | Yang | G06F 12/0895 |
| 2001/0054131 A1* | 12/2001 | Alvarez, II | H04N 19/42 |
| | | | 711/105 |
| 2002/0042862 A1* | 4/2002 | Breternitz, Jr. | G06F 9/3017 |
| | | | 711/125 |
| 2002/0091892 A1* | 7/2002 | Vondran, Jr. | G06F 9/30156 |
| | | | 711/3 |
| 2002/0099907 A1* | 7/2002 | Castelli | G06F 12/0871 |
| | | | 711/113 |
| 2003/0028673 A1* | 2/2003 | Lin | G06F 17/30902 |
| | | | 709/247 |
| 2003/0131184 A1* | 7/2003 | Kever | G06F 12/0802 |
| | | | 711/100 |
| 2003/0188110 A1* | 10/2003 | Abali | G06F 12/08 |
| | | | 711/154 |
| 2005/0038954 A1* | 2/2005 | Saliba | G06F 3/0607 |
| | | | 711/100 |
| 2005/0144388 A1* | 6/2005 | Newburn | G06F 12/0802 |
| | | | 711/118 |
| 2005/0160234 A1* | 7/2005 | Newburn | G06F 12/0802 |
| | | | 711/144 |
| 2006/0047916 A1* | 3/2006 | Ying | G06F 12/0802 |
| | | | 711/144 |
| 2006/0101206 A1* | 5/2006 | Wood | G06F 12/0802 |
| | | | 711/122 |
| 2010/0138614 A1* | 6/2010 | Glasco | G06F 12/0875 |
| | | | 711/144 |
| 2010/0153658 A1* | 6/2010 | Duncan | G06F 13/1663 |
| | | | 711/145 |
| 2010/0228800 A1* | 9/2010 | Aston | G06F 17/30153 |
| | | | 707/822 |
| 2011/0087840 A1* | 4/2011 | Glasco | G06F 12/08 |
| | | | 711/118 |
| 2011/0271055 A1* | 11/2011 | O'Connor | G06F 12/0802 |
| | | | 711/118 |
| 2012/0117311 A1* | 5/2012 | Hong | G06F 1/3275 |
| | | | 711/103 |
| 2012/0210066 A1* | 8/2012 | Joshi | G06F 12/0866 |
| | | | 711/118 |
| 2014/0108731 A1* | 4/2014 | Sardashti | G06F 1/3275 |
| | | | 711/122 |
| 2015/0019813 A1* | 1/2015 | Loh | G06F 12/0866 |
| | | | 711/122 |
| 2015/0019834 A1* | 1/2015 | Loh | G06F 12/023 |
| | | | 711/208 |
| 2015/0193353 A1* | 7/2015 | Habermann | G06F 12/0897 |
| | | | 711/122 |
| 2015/0379682 A1* | 12/2015 | Golas | G06T 9/00 |
| | | | 345/555 |
| 2016/0170878 A1* | 6/2016 | Trika | G06F 12/0886 |
| | | | 711/118 |
| 2016/0335188 A1* | 11/2016 | Romanovskiy | G06F 12/0246 |
| 2016/0342530 A1* | 11/2016 | Pellerin, III | G06F 12/0855 |
| 2017/0123978 A1* | 5/2017 | Krishnamurthy | G06F 12/0802 |
| 2017/0185529 A1* | 6/2017 | Chhabra | G06F 12/14 |
| 2017/0199820 A1* | 7/2017 | Romanovskiy | G06F 12/0873 |
| 2017/0255561 A1* | 9/2017 | Alameldeen | G06F 12/0864 |

OTHER PUBLICATIONS

M. Thuresson, L. Spracklen and P. Stenstrom, "Memory-Link Compression Schemes: A Value Locality Perspective," IEEE presented by Jean Niklas L'orange and Caroline Saehle for TDT01, Norwegian University of Science and Technology, Nov. 11, 2013.

* cited by examiner

CACHE WITH COMPRESSED DATA AND TAG

BACKGROUND

A cache is a memory for temporary storage of data in a data processing apparatus. Commonly, a cache is a smaller, high-speed memory that stores copies of a subset of data from a backing storage device. The backing storage device is typically a larger, slower memory or data storage device. The data in the cache is used by a cache client, such as a central processing unit (CPU). Performance of the CPU is enhanced when often used data is available in the cache, thus avoiding latency associated with reading data from the backing storage device. Each entry in the cache includes the data itself together with a tag associated with the location of the original data in the backing storage device, a validity bit and, optionally, one or more status bits. The size of a cache is determined by the need to store the tags, validity and status bits in addition to the data itself.

For large caches, a large tag store is required. For example, for a large off-chip DRAM cache the tag storage requirements can often exceed what can practically be stored in on-chip SRAM. Storing the tags in DRAM itself, however, has a big latency penalty as both tags and data need to be read from the DRAM, and DRAM access is much slower than SRAM access.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
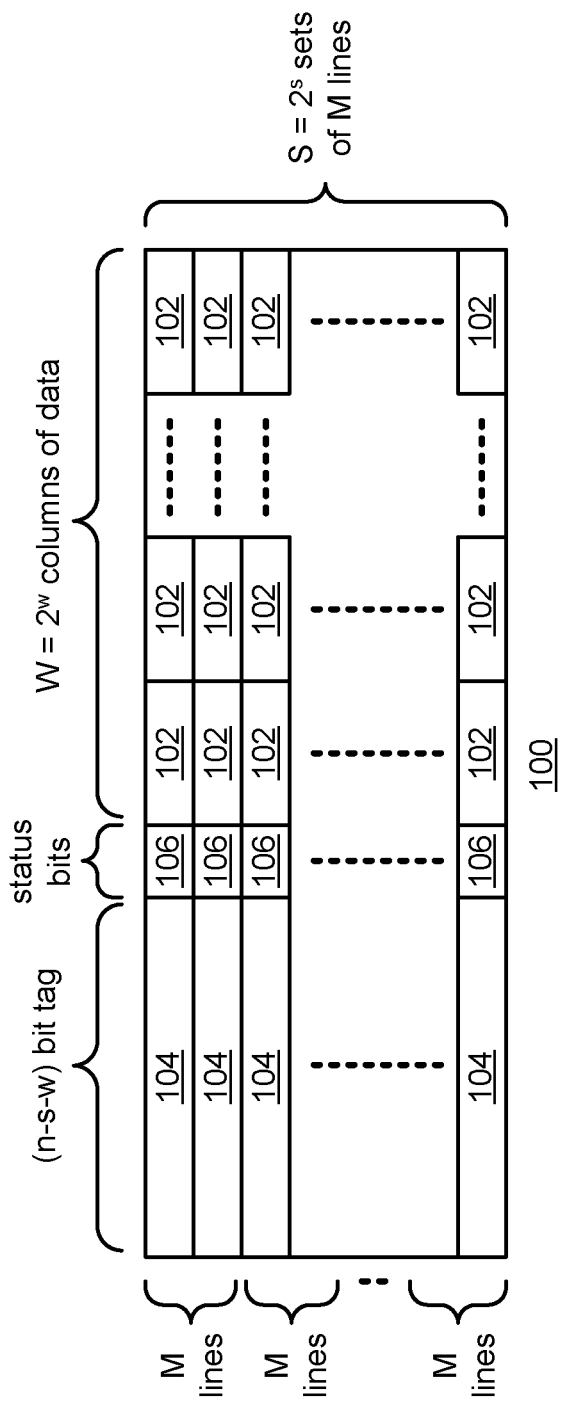
FIG. 1 is a block diagram of a data processing system, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Mobile devices with in-package, but off-chip dynamic random access memory (DRAM) caches are becoming increasingly important. Moreover, future system-on-chip (SoC) servers, mobile devices and other devices may use storage class memory (SCM).

Because of the latency of accessing SCM, it is likely that some or all of the DRAM would be dedicated to caching the SCM data. SCM may be four or more times as dense as DRAM, so maintaining all the required address tags in an on-chip static random access memory (SRAM) would be difficult or expensive.

Possible ways for maintaining address tags for cached SCM data include:
  (a) The SCM tags could be held in SRAM, but that might require 100's MB of SRAM for normal cache sized lines (e.g. 64 Bytes).

(b) The SCM could be cached at a larger granularity, but for sparsely accessed data this would involve more data movement.

(c) The SCM tags and data could reside as separate data in DRAM, but that would require two accesses (one for tag, followed by one for data) doubling the time for a cache hit.

(d) The SCM could be cached in non-standard DRAM and both the tag and data could be co-located, however this non-standard DRAM would not be a commodity item and would incur a large carry cost if it is packaged with the central processing unit (CPU).

Alternatively, the SCM could not be cached. However, the latency in accessing the SCM may be as much as ten times longer than the latency for DRAM. For frequently accessed data that does not fit in a lowest level cache (LLC) this would be detrimental to performance.

The SCM could be cached at a page granularity and moved by the operating system (OS). However this would depend upon the OS having some mechanism to identify 'hot' data as well as for moving entire pages of data. This is problematic for any type of sparse data access and introduces a bookkeeping overhead to identify the 'hot' data and periodically invoking the OS to 'migrate' the 'hot' data from SCM to DRAM.

Various embodiments of the present disclosure relate to method and apparatus for caching data and associated address tags in a DRAM such that data and address tag may be accessed in a single access. For example, data and associated address tags may be cached in a traditional 64-bit×8 burst DRAM such that data and address tag may be accessed in a single access. For example, for a 64-byte cache line in direct-mapped cache having 4K lines, approximately 46-bits of storage are required for tag information, plus additional bits for status information.

It has been shown that for DRAM caches, latency is more important that hit-rate. A direct-mapped cache is the easiest way to reduce latency.

The embodiments discussed below described how data and associated address tags are accessed from a DRAM cache. The embodiments balance access latency with DRAM storage capacity overhead. Some embodiments are discussed with reference to a 64-byte cache line, but other size cache lines may be used without departing from the present disclosure.

In accordance with a first embodiment, a system is organized such that each DRAM memory module has an extra DRAM device ('chip') that stores the tags and status information for each cache-line region. When a cache-line is fetched by a DRAM controller, it reads the cache-line data in 8 bursts over a 64-bit wide double data rate (DDR) data bus structure. The DRAM controller simultaneously reads the tag and status information from the extra chip possibly using fewer burst on the data bus structure. This embodiment has the benefit of simple implementation at the DRAM controller and guaranteed access of the data, tag and status bits with a single DRAM access. However, unless this arrangement becomes common place, the extra DRAM device may be more expensive than commodity DRAM modules.

Herein, the address tag, together with associated status bits and any other bits that relate to the data are termed 'metadata'.

Certain embodiments relate to an apparatus for storing a plurality of cache lines, where each cache line is configured to store data and metadata associated with the data, and where the metadata includes an address tag. The apparatus includes a first memory region comprising a plurality of rows, each row of the plurality of rows comprising one or more primary blocks and each primary block sized to store data of a cache line. A first logic circuit is configured to compress data of a first cache line or both data and metadata of the first cache line to produce a compressed data block. When the compressed data block fits in a primary block, the compressed data block is stored in the first primary block. A second logic circuit is configured to decompress data retrieved from a second primary block to recover data and metadata of a second cache line associated with an address and determine if an address tag of the metadata matches the address.

The apparatus may also include a second memory region comprising a plurality of overflow blocks, each overflow block associated with a primary block of the plurality of primary blocks. The first logic circuit is further configured to assert a 'Fits' bit associated with a first primary block when the compressed data block fits in a primary block and is stored in the first primary block. When the compressed data block does not fit in a primary block, the 'Fits' bit associated with the first primary block is de-asserted, a first portion of the data and metadata of the first cache line is stored in the first primary block and a second portion of the data and metadata of the first cache line is stored in an overflow block associated with the first primary block. The second logic circuit is configured to decompress data retrieved from a second primary block to recover data and metadata of a second cache line associated with an address when a 'Fits' bit associated with a second primary block is asserted. When the 'Fits' bit associated with the second primary block is not asserted, a first portion of the data and metadata of the second cache line is retrieved from the second primary block and a second portion of the data and metadata of the second cache line is received from a second overflow block, where the second overflow block is associated with the second primary block.

An overflow block of the plurality of overflow blocks may be located in the same memory row as the primary block with which it associated.

In certain embodiments, the size of an overflow block is insufficient to store metadata of a cache line and the memory row is configured to store a 'RowOverflow' bit. The apparatus then includes a third memory region of sufficient size to store metadata of the plurality of cache lines in a plurality of third overflow blocks and the first logic circuit is configured to store a first portion of the data and metadata of the first cache line in the first primary block and store a second portion of the data and metadata of the first cache line of the first cache line in a third overflow block associated with the first primary block when a memory row is not large enough to hold all of the compressed data associated with the memory and assert the 'RowOverflow' bit of the memory row. The second logic circuit is configured retrieve data from the second primary block and a third overflow block to recover data and metadata of the first cache line, when the 'RowOverflow' bit is asserted, where the third overflow block is associated with the second primary block.

Each primary block of the first memory region may be associated with one overflow block of the third memory region in a direct mapping.

An overflow block may be sized to store metadata of a cache line and each primary block of the first memory region may be associated with one overflow block of the second memory region.

The apparatus may include a memory controller that comprises the first and second logic circuits, where the first memory region and the second memory region are regions of a dynamic random access memory (DRAM) and where the memory controller is coupled to the DRAM via a bus.

The first logic circuit may be configured to store the first and second portions of the data and metadata of the first cache line in a compressed form when the compressed data block does not fit in a primary block. Alternatively, the first logic circuit may be configured to store the first and second portions of the data and metadata of the first cache line in uncompressed form when the compressed data block does not fit in a primary block.

The apparatus may include a backing storage device, such as a storage class memory (SCM), where the address comprises an address in the backing storage device.

Instructions of a hardware language that define the apparatus may be stored in a non-transient computer readable medium.

In accordance with certain embodiments, a method is provided for reading a cache line containing cache line data and cache line metadata. The method comprises locating a primary block in a first memory region, the primary block associated with the cache line, and reading first data in the located primary block. If a 'fits' bit associated with the first data is asserted, the first data is decompressed to obtain the cache line data and the cache line metadata. If the 'fits' bit associated with the first data is not asserted, an overflow block in a second memory region is located, the overflow block associated with the located primary block, second data held in the overflow block is read and the first and second data are combined to obtain the cache line data and the cache line metadata.

The cache line may be identified from an address in a backing storage device by identifying a first address tag from the address, comparing the first address tag with a second address tag of the metadata, where the cache line is associated with an address, the method further comprising, and reading the backing storage device at the address if the first and second tags do not match. The first memory region and the second memory region may be regions of a dynamic random access memory (DRAM), in which case the first data is read by accessing the DRAM via a data bus structure.

In accordance with certain further embodiments, a method is provided for writing a cache line containing cache line data and cache line metadata to a memory. The memory includes a first memory region configured as a plurality of primary block and a second memory region configured as a plurality of overflow blocks, each overflow block of the plurality of overflow block associated with a corresponding primary block of the plurality of primary block. The method comprises compressing the cache line data and the cache line metadata to produce compressed data. If the compressed data fits within a primary block of the plurality of primary blocks, a primary block associated with the cache line is identified, the compressed data is written to the identified primary block; and a 'fits' bit associated with the identified primary block is asserted. If the compressed data does not fit within a primary block of the plurality of primary blocks, a primary block associated with the cache line is identified, a first portion of the cache line data and the cache line metadata is written to the identified primary block, an overflow block associated with the cache line is identified, a second portion of the cache line data and the cache line metadata is written to the identified overflow block and a 'fits' bit associated with the identified primary block is de-asserted.

The first memory region and the second memory region may be regions of a dynamic random access memory (DRAM), in which case the first data is read by accessing the DRAM via a data bus structure.

The disclosure is described in more detail below, with reference to the figures.

FIG. 1 is a diagrammatic representation of a cache memory 100. Data is stored in blocks 102 that are, at least conceptually, arranged as an array having a number W of columns and a number of lines. The lines are conceptually grouped as S sets of M lines. For ease of access, $W=2^w$, $S=2^s$ and $M=2^m$ are often selected to be powers of 2. In one example, each block 102 is a byte of data, w=6, s=12 and m=0, so that W=64, S=4096, and M=1. The location of the original data, of which blocks 102 are copies, is identified by tags 104 and by the location of the data within the array. In addition, each cache line includes one or more status bits 106. The status bits may indicate, for example, if the data in line is valid or invalid, and permissions associated with the data. For example, status bits 106 might indicate the MESI state of the data (i.e. whether the data is Modified, Exclusive, Shared or Invalid). The tags 104 and status bits 106 are herein termed 'metadata'.

The tag and data structures may be separated into two, with conceptually the same numbers of sets/ways, so a match found in a region of the tag array has a corresponding region in the data array. The data RAM may comprise multiple RAMs that can be individually accessed, so that, when a match is found in the tag array, the correct data element can be accessed.

Figure 2:
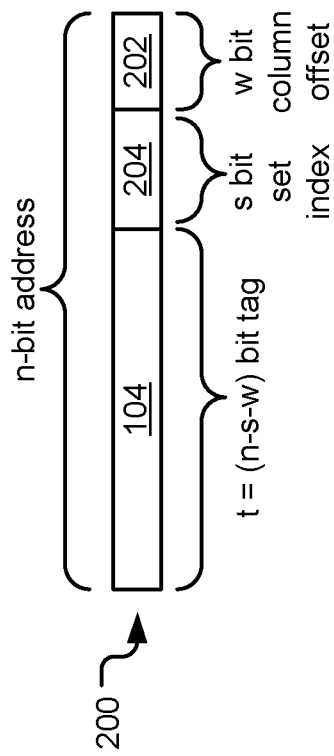
FIG. 2 is a diagrammatic representation of a memory address.

FIG. 2 is a diagrammatic representation of an address 200 in a backing storage device, such as a main memory. The address 200 has n bits. For example, in some data processing systems, n=64. The lowest w bits 202 of the address 200 may be used as a column offset that indicates which data column of cache 100 could contain a copy of the data stored at that address in the backing memory. The next s bits 204 of the address 200 comprise a set index that indicates which set of cache lines could contain the copy of the data. The upper t bits of the address are used as tag for the address, where t=n−s−w. When M=1, the cache is directly mapped and a copy of the data is stored in the cache if the tag matches the tag stored at the cache line indicated by the set index. When M>1, a copy of the data is stored in the cache if the tag matches the tag stored at any cache line in the set of lines indicated by the set index. If the tag does not match any of the M tags in the set, the data is known to be not in the cache.

Figure 3:
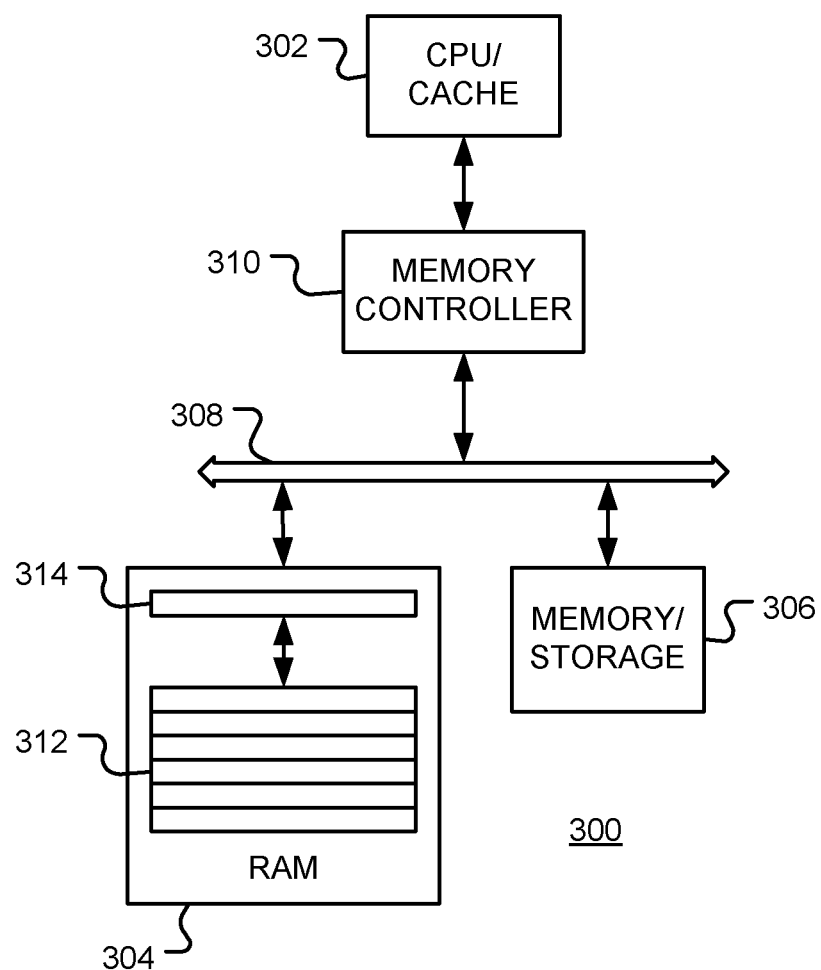
FIG. 3 is a block diagram of a data processing apparatus, in accordance with various embodiments of the disclosure.

FIG. 3 is a simplified block diagram of a data processing apparatus 300 in accordance with various embodiments of the disclosure. The apparatus includes a cache client 302, such as one or more central processing units (CPU's). A CPU may include one or higher level caches. The apparatus 300 also includes random access memory (RAM) 304, such as an dynamic RAM (DRAM) or static RAM (SRAM) for example, and backing storage device 306. The backing storage device 306 may have a larger storage capacity than RAM 304, or a slower access time. For example, backing storage device 308 may be a memory, a storage class memory (SCM), flash memory, solid state memory, hard disk drive (HDD), other type of storage, or a combination thereof. Backing storage device 306 may provide non-volatile storage, volatile storage, or a combination thereof.

In this example, RAM 304 and backing storage device 306 are coupled to the cache client 302 via a bus structure 308 and memory controller 310. For example, the bus structure 308 may be a 64-bit wide DDR bus.

Commonly, the memory cells of RAM 304 are configured in rows 312. The length of the rows and the bus structure are designed to work efficiently together. The number of bits in each row of a DRAM may be a multiple of the bus width. For example, a DRAM coupled to a 64-bit bus may have 2048=32×64 bits in each row. A row to be accessed may be stored in row buffer 314.

In accordance with the present disclosure, RAM 304 is used as a cache to speed data transfer between the cache client 302 and the backing storage device 306. In one embodiment, dynamic RAM (DRAM) is used. DRAM chips are manufactured in very high numbers and, consequently, are inexpensive.

In one example, given above, a cache line comprises 64 bytes of data. Since a byte comprises eight bits, a cache line can be read in eight bursts using a 64-bit bus.

In the embodiments described below, RAM 304 will be referred to a DRAM. However, the disclosure is not limited to DRAM and the method may be used with apparatus having other types of memory.

In a simple approach, the cache data is stored in one region of DRAM 304, while the associated tags and status bits are stored in another region of the DRAM 304. In use, the tag associated with an address to be accessed is checked against the tags in the M lines that might contain the data. This requires between 1 and M DRAM accesses to retrieve the tags. If a match is found (termed a 'cache hit') the data is then read. Thus, at least two DRAM accesses are required. This is disadvantageous, since DRAM accesses are slower compared to other memory commonly used for caches.

One aspect of the present disclosure is a method for tag checking and data reading in a cache that, at least in some cases, requires only a single value to be read.

In accordance with a second embodiment, a 64-byte cache line together with the metadata are compressed into a compressed data block having a reduced number of bits. The compressed data block corresponds to a compressed cache line. A 'Fits' bit is stored that indicates if the compressed cache line fits into a 64-byte location in DRAM. When the compressed cache line fits into 64-bytes, only a single access is required to get the data and the metadata. This situation is detected by the DRAM controller after reading whether the 'Fits' bit is asserted, or not. If the 'Fits' bit is asserted, a second DRAM access is not required and both the tag and data are available after decompressing the 64-byte data read. In this approach, sufficient space is allocated per DRAM row such that there is always enough space if the compression fails. This is done by allocating a distinct overflow area at the end of the DRAM row for each cache block, for storing data that did not fit into the 64-byte region. This overflow region must be wide enough to store the metadata—although this information may be stored elsewhere. For example, the metadata could be stored in the original block region so as to provide an indication if an overflow read is required. If, after compression, the 64-bytes of data and the metadata completely fit in 64-byte region, then the overflow area is not used and 'Fits' bit is asserted. Otherwise, the 'fits' bit is de-asserted. The metadata and data are stored in a combination of the 64-byte region for the cache line and the designated overflow region. The data and metadata may be arranged in various ways within the combined region. The 'Fits' bit may be stored in 64-bytes region to enable a single access to be made. While the example above depicts a 64-byte cache line, other sizes may be used.

In accordance with a further embodiment, only lines that fit after compression are allocated.

It takes the DRAM controller two DRAM accesses, one to read the cache-line, followed by another to read the appropriate overflow region, if needed. This embodiment benefits from an ability to use commodity DRAM memory modules, since the overflow area is implemented in the DRAM controller via address mapping functions. In this embodiment, the additional amount of DRAM (the 'overhead') required for storing metadata used is not reduced compared with using a separate DRAM device for the metadata, since extra memory is allocated for the overflow region, whether it's used or not. In this embodiment, when the compressed data and metadata do not fit in the 64-byte region, two memory accesses are required to access it.

The data is compressed when written to the cache and decompressed when read from the cache. The compression and decompression functions may be performed by the memory controller when accessing the cache. A variety of data compression techniques are known to those of ordinary skill in the art.

For example, metadata comprising a 46-bit address tag and two status bits uses 6 bytes of storage, thus the amount of memory required for storing metadata is less than 10% of the memory required for the 64-bytes of data in the cache line.

Figure 4:
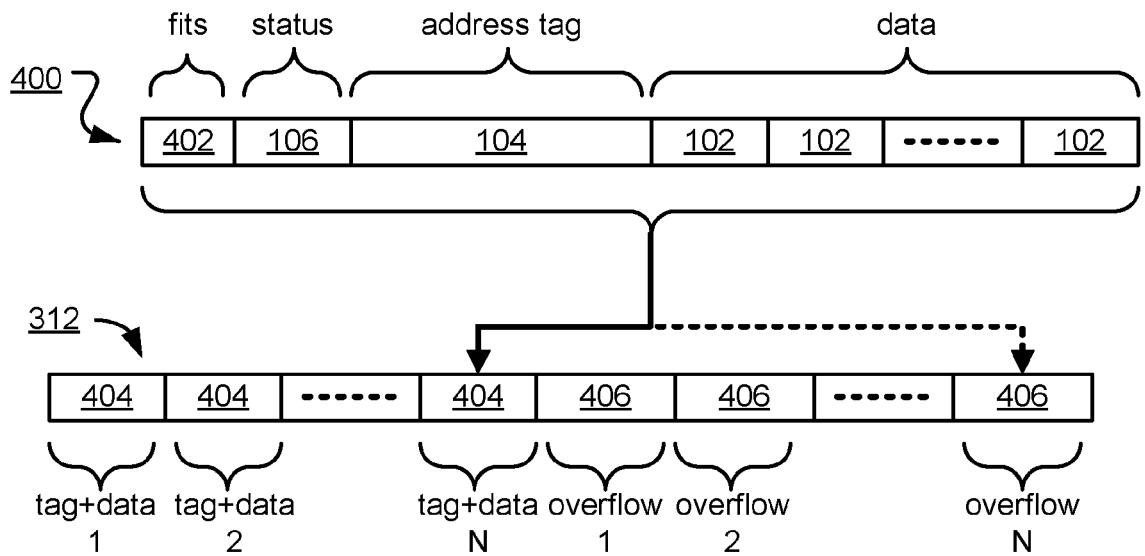
FIG. 4 is a diagrammatic representation of a cache line, in accordance with the various embodiments.

FIG. 4 is a diagrammatic representation of a single cache line 400 in accordance with the various embodiments. A cache will likely contain many such lines. In the example shown, the cache line 400 comprises address tag 104, one or more status bits 106, a 'fits' bit 402 (discussed below), and a number (W) of data entries 102 of. For example, the cache line may contain 64 data entries of size one byte (8-bits). The address tag may contain, for example, 46-52 bits, depending on how memory addresses are mapped to the cache. The cache line contains metadata 104, 106 and 402 in addition to the data entries 102.

In accordance with various embodiment, the cache line is compressed to fit into a region of DRAM smaller than the size of the uncompressed cache line. Referring again to FIG. 4, each cache line 400 is compressed and stored in a region 404 of DRAM memory row 312. For example, for 64 bytes of data, a 46-bit address tag and 2-bit status field, the cache line contains 70 bytes for compression into a 64-byte region. Thus, a relatively low level of compression is required.

A variety of compression techniques are known to those of ordinary skill in the art. For some of the techniques the amount of compression that can be achieved is variable and depends upon patterns in the data, for example. Thus, some cache lines may not be compressed sufficiently to fit into region 404. The 'fits' bit 402 in each block 404 is asserted when the block 404 contains a complete, compressed cache line. Otherwise, the 'fits' bit is not asserted, a first portion of the cache line 400 is stored in block 404 and a second portion, the remainder, is stored in an overflow region 406, as depicted by the broken line in FIG. 4. For the example given above, the block 404 contains 64 bytes and the corresponding overflow region 406 contains up to 7 bytes.

In one embodiment, one overflow region 406 is provided for each block 404.

When a compressed cache line does not fit, the line may be stored in compressed or in uncompressed form.

The status bits may be compressed or uncompressed. However, the 'fits' bit is not compressed.

The data alone may be compressed or the combination of data and tag may be compressed.

An advantage of the compression technique described above is that when the compressed cache line fits in a single block 404, the block can be read efficiently using a single DRAM access without a need for custom access logic, custom DRAM, or a custom bus structure.

When the cache line does not fit, two DRAM accesses may be used to access both the tag and the data.

Figure 5:
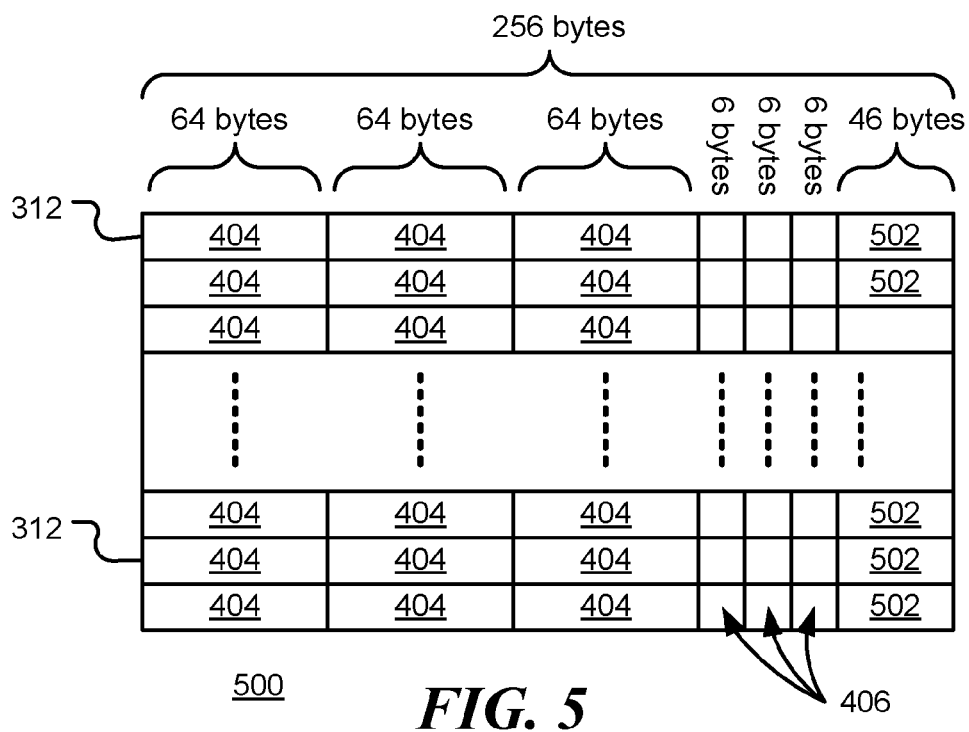
FIG. 5 is a diagrammatic representation of a DRAM configured to store cached data, in accordance with various embodiments.

FIG. 5 is a diagrammatic representation of a DRAM 500 configured to store cached data in accordance with various embodiments. In the example shown, the DRAM is organized into rows of 256 bytes (2K bits). Each row 312 contains three primary blocks 404 of length 64 bytes each, three overflow blocks 406 of length 6 bytes each and free locations 502 length 46 bytes. The free locations 502 may be used to store additional information such an error correction codes, or used for general storage, for example. The DRAM rows may be organized in other ways. Storing the metadata in the same DRAM row as the data itself has the advantage that both data and metadata are placed together in the DRAM row buffer. This reduces latency when a second DRAM access is required.

In accordance with a third embodiment, the amount of extra memory required for storing metadata is reduced. In this embodiment an extra bit is stored per DRAM row and far fewer bits are allocated for overflow.

Figure 6:
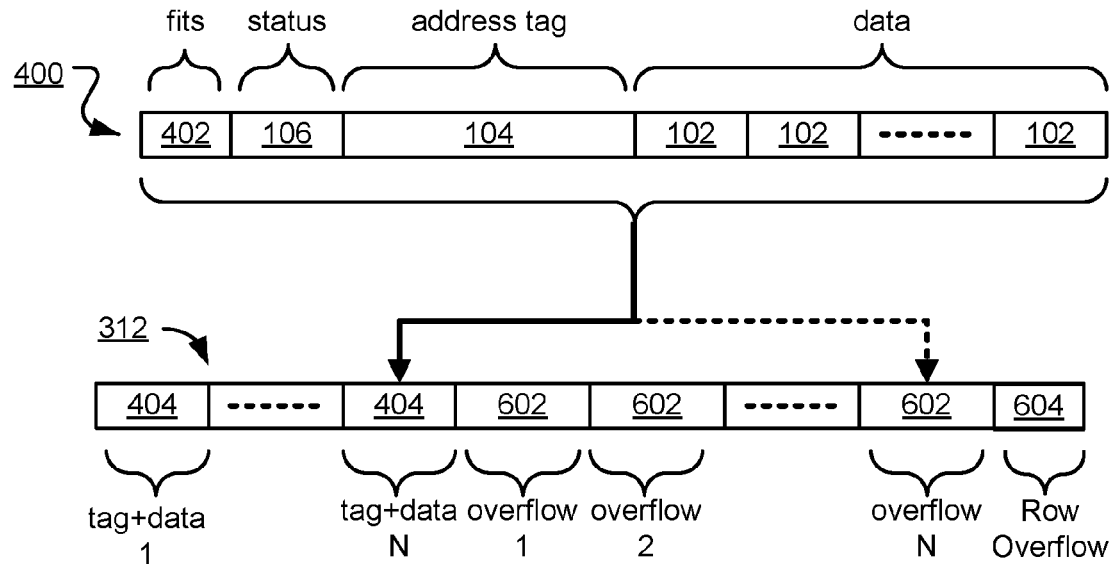
FIG. 6 is a diagrammatic representation of a single cache line stored in a DRAM row, in accordance with various embodiments.

FIG. 6 is a diagrammatic representation of how a single cache line 400 is stored in a DRAM row 312, in accordance with the third embodiment. In this embodiment, each DRAM row 312 contains primary blocks 404 and overflow blocks 602. However, the overflow blocks are of reduced size and are not guaranteed to be of sufficient size to contain all of the overflow information in every instance. As an example, only 6-8 extra bits may be allocated in each overflow block 602 per 64-byte cache-line for the overflow bits. As a result, there may be instances where insufficient overflow capacity is available in the DRAM row to store the compressed metadata and data. To allow for such case, an additional bit, denoted as 'RowOverflow' bit 604, is stored in each DRAM row. The 'RowOverflow' bit indicates when the allocated overflow region is not large enough, even for a single 64-byte cache-line. The 'RowOverflow' bit is set even if a single 64-byte cache-line and its metadata cannot be compressed and accommodated in the 64-byte cache-line and the extra 6-8 bits allocated per cache-line. When a DRAM row is read, the 'RowOverflow' bit is read by the memory controller. When the 'RowOverflow' bit is asserted, 64-bytes read from the DRAM do not contain all of the information. For example, the 64-bytes may contain only data. The additional information is then read from a different memory location in a subsequent DRAM access for all the 64-byte cache-lines that reside in a row with the 'RowOverflow' bit set. This scheme reduces the storage overhead in the common case where 64-bytes worth of storage is expected to contain all of the data and other metadata in compressed form. However, while less memory is required, a second access may be needed more frequently. This approach works with commodity memory modules.

A fourth embodiment utilizes a standard DRAM together with a 72-bit wide (×72) bus. These may conform to a standard such as the ×72 standard of JEDEC™ Solid State Technology Association. The ×72 JEDEC™ DRAM interface provides enables both data and an associated error correcting code (ECC) to be read in a single access. This interface is used in server memory systems, for example, to increase the reliability of the system by eliminating errors related to corrupted memory. The ×72 interface is organized as ×64+×8 where the 64-bits are data bits stored in the memory (cache-line sized) and the remaining 8-bits are used for storing the ECC values for the data bits. These 8-bits provide storage for error detection and correction by the memory controller.

In accordance with the fourth embodiment this claim, the entire 72-byte cache-line (and its ECC value) will be compressed along with the metadata described above. The compressed data is stored either in the 72-byte field, if it fits, otherwise overflow bits will be stored in the overflow region at the end of the DRAM row, as described above.

Note that the first and third embodiments described above can also be implemented while accounting for ECC enabled and fault tolerant memory systems.

For every cache line that is being stored in the DRAM, if the compression fails to reduce the metadata to the nominal cache-line size (e.g. 64-bytes), overflow data is stored elsewhere. In the embodiments two and four described above the overflow data is co-located in the same DRAM row. This minimizes latency for the case where the compression doesn't fit, since the second request will hit in the DRAM row buffer. However, if the compression success rate is high, this might only provide a small benefit.

Figure 7:
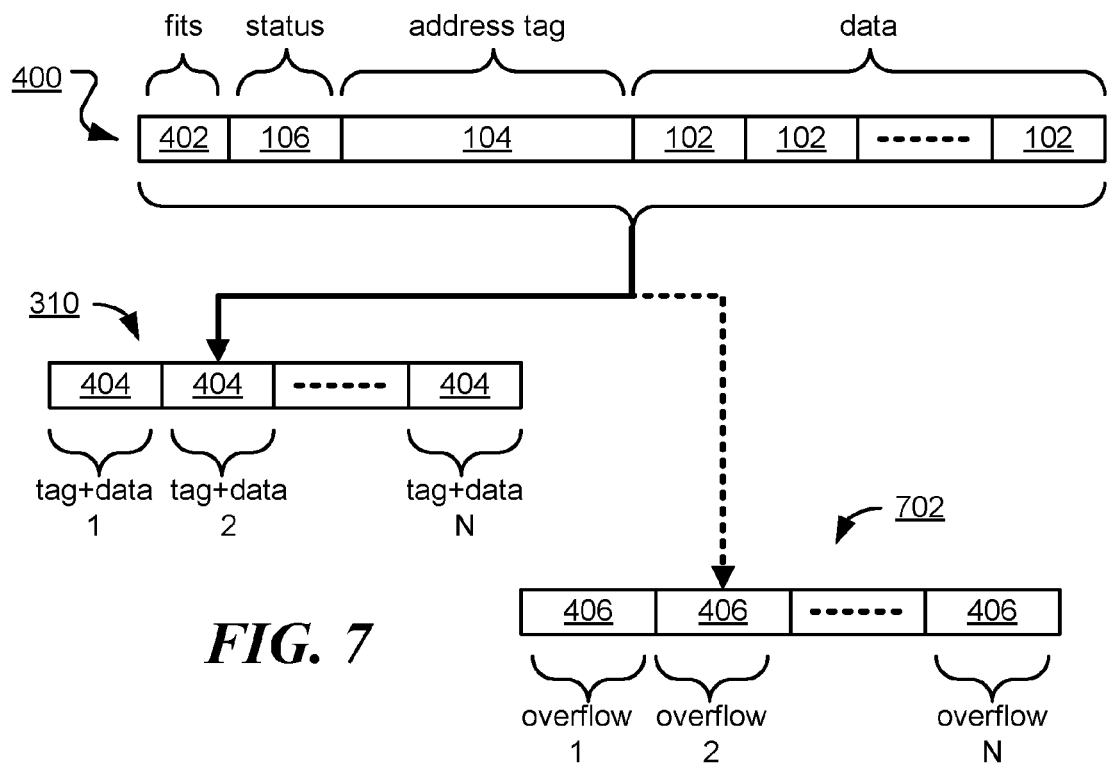
FIG. 7 is a diagrammatic representation of a cache line is stored in a DRAM and an overflow memory region, in accordance with various embodiments.

In accordance with fifth embodiment of the disclosure the overflow data is stored in an entirely different location in DRAM. FIG. 7 depicts how a cache line 400 is stored in a DRAM 312 and an overflow memory region 702. For example, the overflow region 702 may be a reserved area of DRAM large enough to store all of the potential overflow data in overflow blocks 406.

Figure 8:
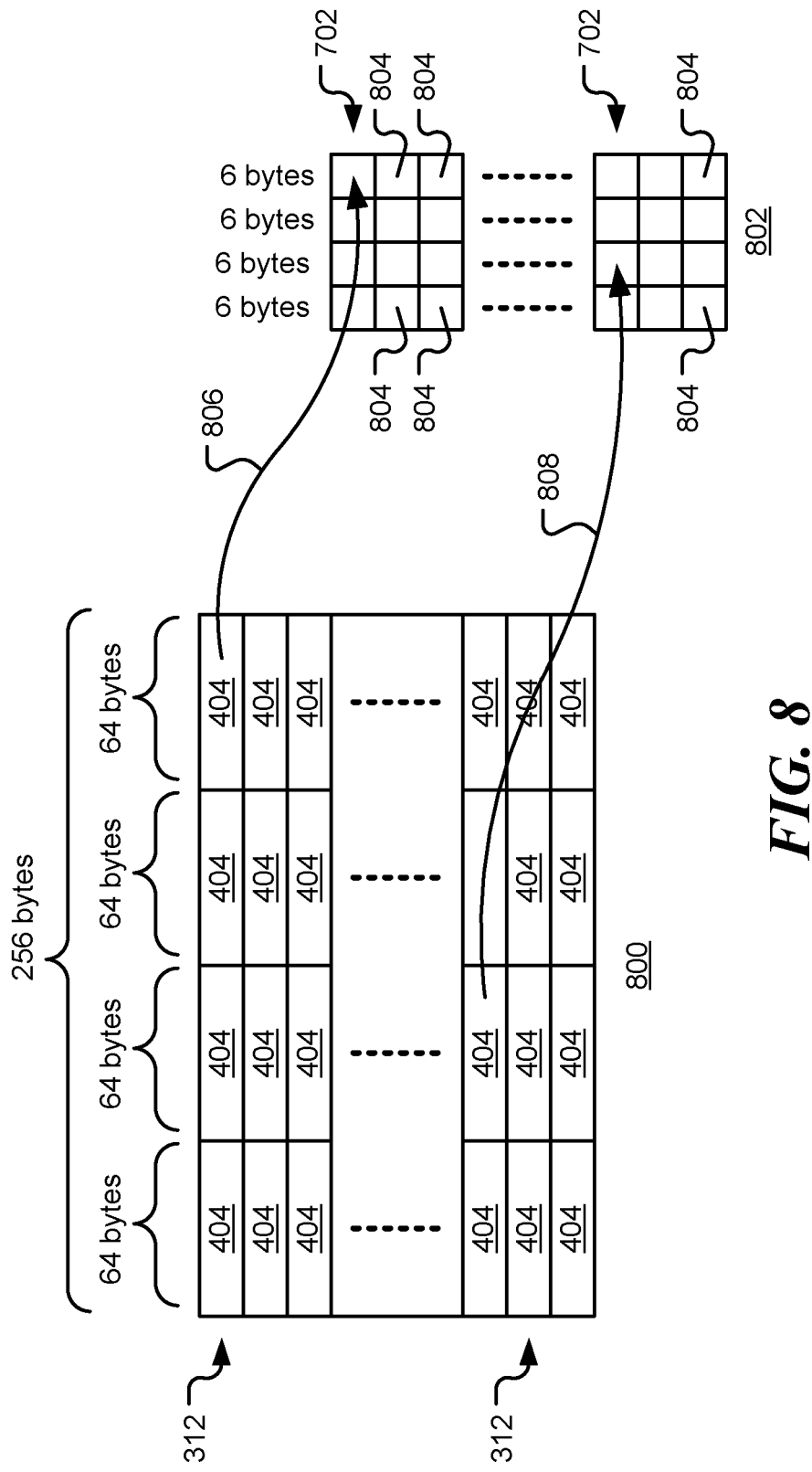
FIG. 8 is a diagrammatic representation of direct mapping to locations in an overflow data area, in accordance with various embodiments.

Locations in the cache may be direct-mapped to locations in the overflow data area, as illustrated in FIG. 8, for example. In the example shown, each row 312 of the DRAM region 800 used to store four primary blocks 404 of length 64 bytes, while each row 702 of overflow DRAM region 802 is used to store four overflow blocks of length 6 bytes (48 bits). In operation, a cache line index is mapped to a primary block 404. If the primary block 404 was not sufficiently compressible, as indicated by the 'Fits' bit, the same index is used to identify the associated overflow block 804 in the overflow region 802. For example, the index could be multiplied by 6 (48-bits of data) and used to index into the overflow region. This approach makes efficient use of available DRAM without a need to manage a list of free locations. In FIG. 8, arrows 806 and 808 indicate mappings between primary blocks 404 and associated overflow blocks 804.

The mechanisms discussed above will also work seamlessly with fault tolerant memory systems, such as the Chipkill™ enabled DRAM memory systems of IBM Corporation, for example. Fault tolerant technology is used to prevent data loss in DRAM main memory systems where an entire chip (DRAM device) failure on the DRAM memory module can be tolerated via an extra chip. It also provides the ability to correct multi-bit errors arising due to data corruption within a single DRAM chip. For example, a fault tolerant memory system might have nine (9) instead of eight (8) ×8 DRAM chips. This extra chip is used to "spread" the 64-bit data using a variety of encoding techniques that enable recovery of data due to a single faulty chip in the memory system.

Figure 9:
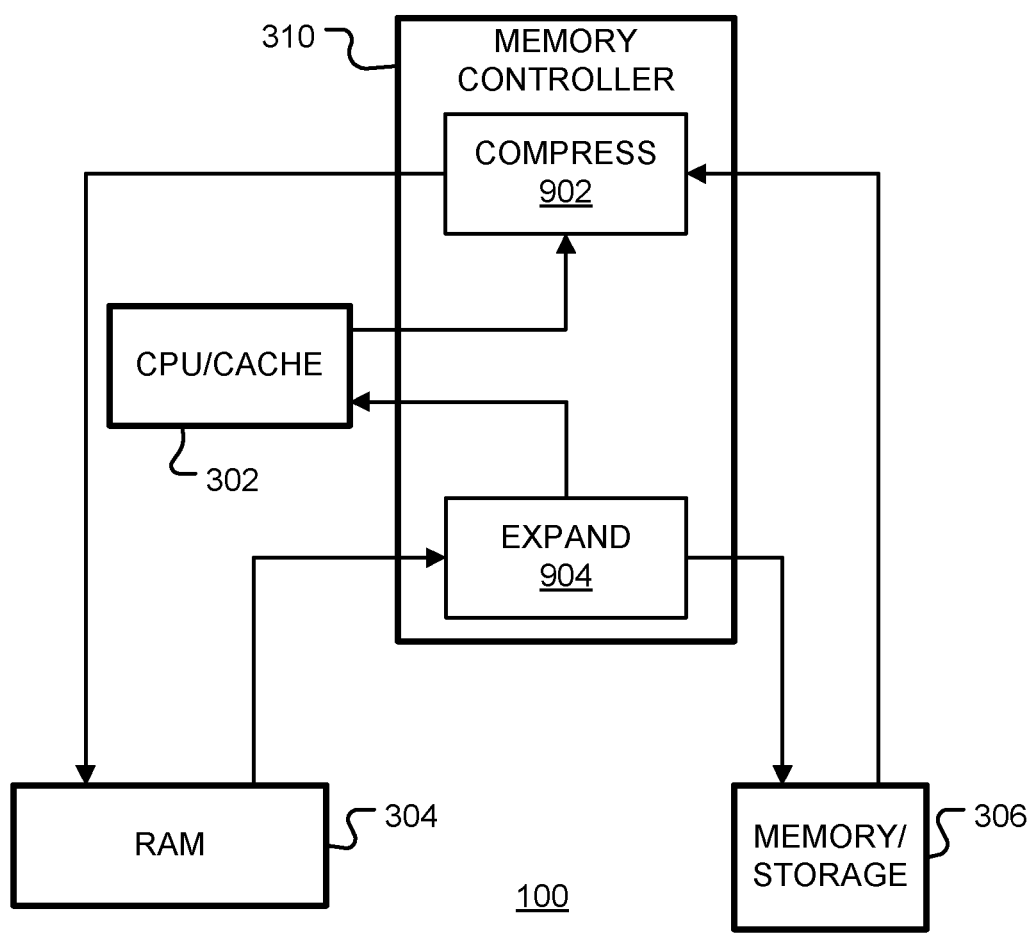
FIG. 9 is a block diagram of a data processing apparatus, in accordance with various embodiments.

The compression technique may be implemented in memory controller 310, for example, as depicted in FIG. 9. Compression logic circuit 902 and decompression (expansion) logic circuit 904 is added to the memory controller 310 to compress data to be stored in the DRAM cache 304 and to decompress or expand data read from the DRAM cache. As indicated, the data to be compressed is read from backing storage device 306 and expanded data is written back to the backing storage device 306. In addition, expanded data may be passed to cache client 302 and data to be compressed may be received from the cache client 302.

Compression/Decompression logic circuits may be implemented at other locations in the system. For example, the logic circuit may be implemented in the system interconnect.

Figure 10:
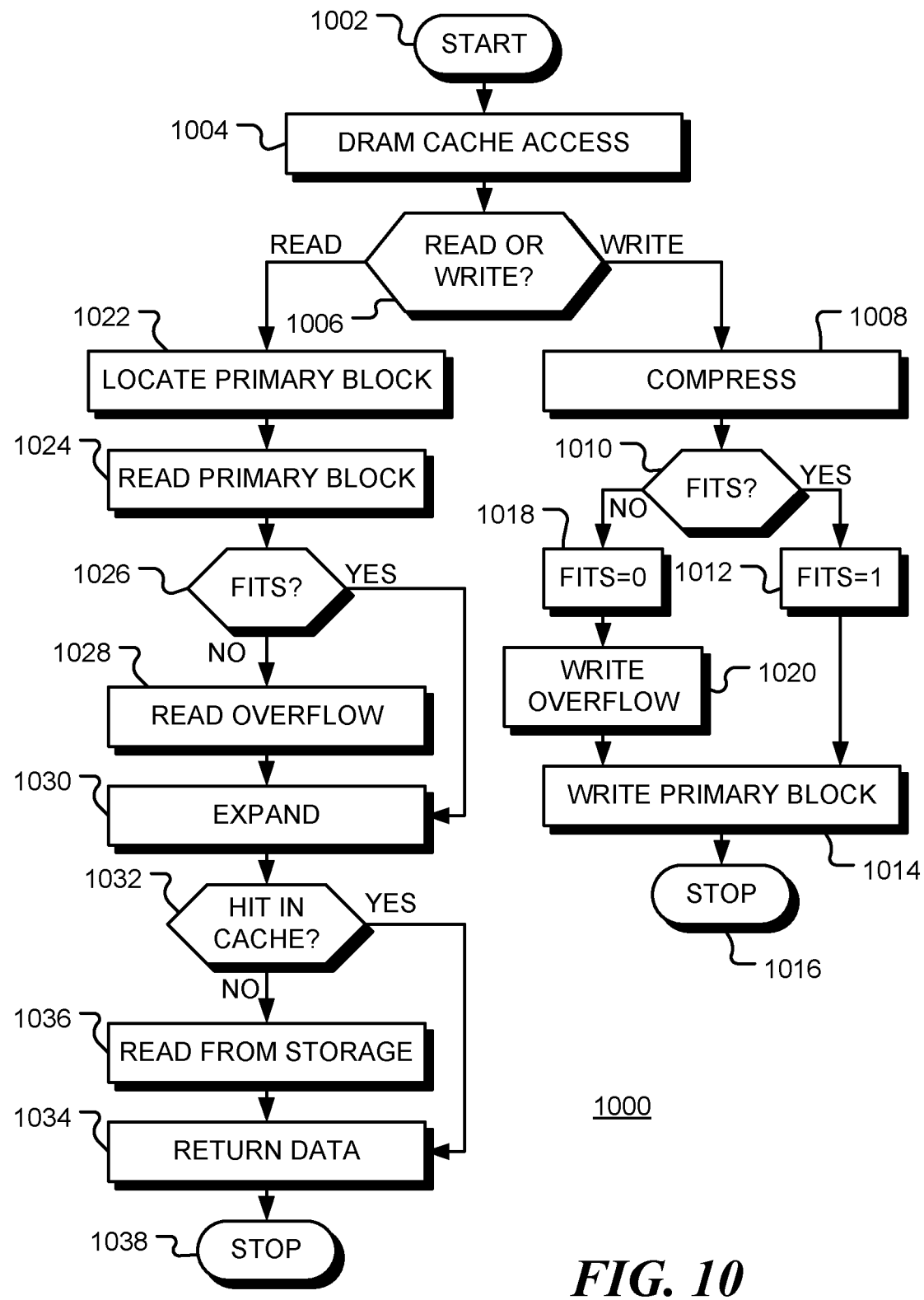
FIG. 10 is a flow chart of a method for caching data in a DRAM cache, in accordance with various embodiments.

FIG. 10 is a flow chart 1000 of a method for caching data in a DRAM cache, in accordance with various embodiments. Following start block 1002, a DRAM cache line access is requested at block 1004. If the access is a write access, as depicted by the 'WRITE branch from decision block 1006, the cache line, including data and the associated address tag, is compressed at block 1008. If the compressed data fits within a single primary block, as depicted by the positive branch from decision block 1010, the 'Fits' bit is set to 1 at block 1012 and the compressed data is written to the primary block at block 1014. No further action is needed and the method terminates at block 1016. If the access is a read access, as depicted by the 'READ' branch from decision block 1006, the primary block is located in the DRAM cache at block 1022 using the address of the requested data. Data in the primary block is read at block 1024. If the 'Fits' bit in the read data is not set, as depicted by the negative branch from decision block 1026, the corresponding overflow region is read at block 1028 to obtain the complete compressed cache line. If the 'Fits' bit in the read data is set, as depicted by the positive branch from decision block 1026, the corresponding overflow region does not need to be read. The cache line is expanded or decompressed at block 1030 to recover the data and the associated tag. If cache hit occurs, as depicted by the positive branch from decision block 1032, the tag matches the tag of the requested data, and the read data is returned at block 1036. If the tag does not match the tag of the requested data, as depicted by the negative branch from decision block 1032, the data is read from the backing storage device at block 1036 and the data is returned at block 1034. The access is completed, and the process terminates at block 1038.

The method described above may be implemented in logic in a memory controller, in a separate logic located between the memory controller and DRAM that communicates with the memory controller. The logic may be custom logic, however, some or all elements of the method could be implemented in configurable logic, such as programmable processor or field programmable gate array (FPGA).

Those skilled in the art will recognize that the present invention may be implemented using a programmed processor, reconfigurable hardware components, dedicated hardware components or combinations thereof. Similarly, general purpose computers, microprocessor based computers, micro-controllers, optical computers, analog computers, dedicated processors and/or dedicated hard wired logic may be used to construct alternative equivalent embodiments of the present invention.

Further, the components of the data processing system described above may be described by instructions of a Hardware Description Language. These instructions may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An apparatus for storing a plurality of cache lines, where each cache line is configured to store data and metadata associated with the data, and where the metadata includes an address tag, the apparatus comprising:
    a first memory region comprising a plurality of rows, each row of the plurality of rows comprising one or more primary blocks and each primary block sized to store data of a cache line;
    a second memory region comprising a plurality of overflow blocks, each overflow block associated with a primary block of the plurality of primary blocks;
    a first logic circuit configured to:
        compress data of a first cache line or both data and metadata of the first cache line to produce a compressed data block;
        when the compressed data block fits in a primary block, store the compressed data block in the first primary block; and
    a second logic circuit configured to:
        decompress data retrieved from a second primary block to recover data and metadata of a second cache line associated with an address; and
        determine if an address tag of the metadata matches the address,
    where the first logic circuit is further configured to:
        assert a 'Fits' bit associated with a first primary block when the compressed data block fits in a primary block and is stored in the first primary block; and
        when the compressed data block does not fit in a primary block, de-assert the 'Fits' bit associated with the first primary block, store a first portion of the data and metadata of the first cache line in the first primary block and store a second portion of the data and metadata of the first cache line in an overflow block associated with the first primary block; and
    where the second logic circuit is further configured to:
        decompress data retrieved from a second primary block to recover data and metadata of a second cache line associated with an address when a 'Fits' bit associated with a second primary block is asserted; and
        when the 'Fits' bit associated with the second primary block is not asserted, retrieve a first portion of the data and metadata of the second cache line from the second primary block and retrieve a second portion of the data and metadata of the second cache line from a second overflow block, where the second overflow block is associated with the second primary block.

2. The apparatus of claim 1, where an overflow block of the plurality of overflow blocks is located in the same memory row as the primary block with which it associated.

3. The apparatus of claim 2, where a size of an overflow block of the plurality of overflow blocks is insufficient to store metadata of a cache line and where the memory row is configured to store a 'RowOverflow' bit, the apparatus further comprising:
    a third memory region of sufficient size to store metadata of the plurality of cache lines in a plurality of third overflow blocks;
    where the first logic circuit is configured to:
        store a first portion of the data and metadata of the first cache line in the first primary block and store a second portion of the data and metadata of the first cache line of the first cache line in a third overflow block associated with the first primary block when a memory row is not large enough to hold all of the compressed data associated with the memory and assert the 'RowOverflow' bit of the memory row; and where the second logic circuit is configured:

retrieve data from the second primary block and a third overflow block to recover data and metadata of the first cache line, when the 'RowOverflow' bit is asserted, where the third overflow block is associated with the second primary block.

4. The apparatus of claim 3, where each primary block of the first memory region is associated with one overflow block of the third memory region in a direct mapping.

5. The apparatus of claim 1, where an overflow block of the plurality of overflow blocks is sized to store metadata of a cache line.

6. The apparatus of claim 1, where each primary block of the first memory region is associated with one overflow block of the second memory region.

7. The apparatus of claim 1, further comprising a memory controller that comprises the first and second logic circuits, where the first memory region and the second memory region are regions of a dynamic random access memory (DRAM) and where the memory controller is coupled to the DRAM via a bus.

8. The apparatus of claim 1, where the first logic circuit is configured to store the first and second portions of the data and metadata of the first cache line in a compressed form when the compressed data block does not fit in a primary block.

9. The apparatus of claim 1, where the first logic circuit is configured to store the first and second portions of the data and metadata of the first cache line in uncompressed form when the compressed data block does not fit in a primary block.

10. The apparatus of claim 1, further comprising a cache client.

11. The apparatus of claim 1, further comprising a memory controller that comprises the first and second logic circuits.

12. The apparatus of claim 1, further comprising a backing storage device, where the address comprises an address in the backing storage device.

13. The apparatus of claim 12, where the backing storage device comprises a storage class memory (SCM).

14. A non-transient computer readable medium containing instructions of a hardware language that define the apparatus of claim 1.

15. A method of reading a cache line containing cache line data and cache line metadata, the method comprising:

locating a primary block in a first memory region, the primary block associated with the cache line;
reading first data in the located primary block;
if a 'fits' bit associated with the first data is asserted, decompressing the first data, to obtain the cache line data and the cache line metadata;
if the 'fits' bit associated with the first data is not asserted:

locating an overflow block in a second memory region, the overflow block associated with the located primary block;
reading second data held in the overflow block; and
combining the first and second data to obtain the cache line data and the cache line metadata.

16. The method of claim 15, further comprising:
identifying the cache line from an address in a backing storage device;
identifying a first address tag from the address;
comparing the first address tag with a second address tag of the metadata;
where the cache line is associated with an address, the method further comprising; and
reading the backing storage device at the address if the first and second tags do not match.

17. The method of claim 16, where the backing storage device comprises a storage class memory (SCM).

18. The method of claim 16, where the first memory region and the second memory region are regions of a dynamic random access memory (DRAM) and where reading the first data comprises accessing the DRAM via a data bus structure.

19. A method of writing a cache line containing cache line data and cache line metadata to a memory comprising a first memory region configured as a plurality of primary block and a second memory region configured as a plurality of overflow blocks, each overflow block of the plurality of overflow block associated with a corresponding primary block of the plurality of primary block, the method comprising:

compressing the cache line data and the cache line metadata to produce compressed data;
if the compressed data fits within a primary block of the plurality of primary blocks:
identifying a primary block associated with the cache line;
writing the compressed data to the identified primary block; and
asserting a 'fits' bit associated with the identified primary block; and
if the compressed data does not fit within a primary block of the plurality of primary blocks:
identifying a primary block associated with the cache line;
writing a first portion of the cache line data and the cache line metadata to the identified primary block;
identifying an overflow block associated with the cache line;
writing a second portion of the cache line data and the cache line metadata to the identified overflow block; and
de-asserting a 'fits' bit associated with the identified primary block.

20. The method of claim 19, where the first memory region and the second memory region are regions of a dynamic random access memory (DRAM) and where reading the first data comprises accessing the DRAM via a data bus structure.

* * * * *